United States Patent
Zhuang et al.

(10) Patent No.: US 7,251,300 B2
(45) Date of Patent: Jul. 31, 2007

(54) METHOD AND APPARATUS FOR FREQUENCY TRACKING BASED ON RECOVERED DATA

(75) Inventors: Jiayi Zhuang, Shanghai (CN); Jingdong Lin, Irvine, CA (US); Yueheng Sun, San Jose, CA (US)

(73) Assignee: Spreadtrum Communications Corporation, Sunnyvale, CA (US)

( * ) Notice: Subject to any disclaimer, the term of this patent is extended or adjusted under 35 U.S.C. 154(b) by 731 days.

(21) Appl. No.: 10/744,049

(22) Filed: Dec. 22, 2003

(65) Prior Publication Data

US 2005/0135512 A1 Jun. 23, 2005

(51) Int. Cl.
*H04L 27/06* (2006.01)

(52) U.S. Cl. .................. 375/344; 375/142; 375/150; 375/340; 375/341; 375/344; 327/39; 455/75; 455/136; 455/255

(58) Field of Classification Search .......... 375/344, 375/326, 340, 343, 142, 150; 455/192.2, 455/182.2; 374/341; 327/39
See application file for complete search history.

(56) References Cited

U.S. PATENT DOCUMENTS

| | | | | |
|---|---|---|---|---|
| 5,109,544 A | * | 4/1992 | Mittel et al. ............ | 455/182.2 |
| 5,276,706 A | * | 1/1994 | Critchlow ................ | 375/343 |
| 5,625,573 A | * | 4/1997 | Kim ...................... | 375/344 |
| 5,640,431 A | * | 6/1997 | Bruckert et al. .......... | 375/344 |
| 5,818,882 A | * | 10/1998 | Komatsu ................ | 375/344 |
| 5,982,811 A | * | 11/1999 | Harrison et al. .......... | 375/150 |
| 6,275,551 B1 | * | 8/2001 | Nomura et al. ........... | 375/365 |
| 6,560,298 B1 | * | 5/2003 | Froehling et al. ......... | 375/344 |
| 6,735,240 B1 | * | 5/2004 | Kang .................... | 375/148 |
| 6,801,590 B2 | * | 10/2004 | Schweickert et al. ...... | 375/344 |
| 2002/0071506 A1 | * | 6/2002 | Lindquist et al. ......... | 375/344 |
| 2002/0085652 A1 | * | 7/2002 | Okubo et al. ............ | 375/344 |
| 2002/0090923 A1 | * | 7/2002 | Muramoto .............. | 455/192.2 |
| 2003/0058966 A1 | * | 3/2003 | Gilbert et al. ............ | 375/326 |
| 2004/0066737 A1 | * | 4/2004 | Sakaishi ................ | 370/206 |

* cited by examiner

*Primary Examiner*—David C. Payne
*Assistant Examiner*—Leon-Viet Q Nguyen
(74) *Attorney, Agent, or Firm*—Perkins Coie LLP

(57) ABSTRACT

A method of frequency tracking based on recovered data, for use in an automatic frequency control subsystem at the receiver of a mobile station, is disclosed. The frequency tracking mechanism derives frequency error information from the recovered data to determine the adjustment needed at the mobile station's local voltage controlled oscillator in order to track the frequency of the base station.

24 Claims, 5 Drawing Sheets

METHOD AND APPARATUS FOR FREQUENCY TRACKING BASED ON RECOVERED DATA

TECHNICAL FIELD

The present invention relates to frequency tracking at a mobile station for use in a wireless communications environment, and more particularly, using information derived from the recovered data at the receiver of the mobile station to tune a reference local voltage controlled oscillator (VCO).

BACKGROUND

In a wireless communications system, the air interface typically involves a mobile station communicating with a base station over the airwaves. For example, the most common standard for wireless communications in the world is the Global System for Mobile communications (GSM). In one specific implementation, GSM utilizes two bands of 25 MHz, which have been set aside for system use. The 890-915 MHz band is used for mobile station to base station transmissions (reverse link), and the 935-960 MHz band is used for base station to mobile station transmissions (forward link). The GSM protocol uses frequency division duplexing and time division multiple access (TDMA) techniques to provide base stations with simultaneous access to multiple users. Transmissions on both the forward and reverse link are made at a channel data rate of 270.833333 Kbps, using binary Gaussian Minimum Shift Key (GMSK) modulation. Additionally, each link contains traffic channels and control channels. The traffic channels carry the digitized voice or user data. The control channels carry network management or control information such as the frequency correction channel (FCCH).

When a mobile station is powered on, it must first perform a power scan across all the control channels, to identify the channel with the strongest signal. The mobile station then tunes into the strongest channel to locate the FCCH. FCCH carries a frequency correction burst, which occupies time slot 0 for the very first GSM frame and is repeated every ten frames within a control channel multiframe. The FCCH burst allows each mobile station to synchronize its reference local oscillator or voltage controlled oscillator (VCO) to the exact frequency of the base station.

However, the VCO in a mobile station is usually not as robust as the VCO at the base station. Consequently, the frequency will fluctuate with the temperature of the VCO, in addition to other factors, such as aging, that will also contribute to the fluctuation but in a less significant amount. The frequency fluctuation will accumulate over time resulting in degrading the performance of the mobile station's receiver. An automatic frequency control (AFC) subsystem is an important component of a receiver for performance stability. For example, the GSM 11.10 specification requires a mobile station to maintain a carrier frequency to within 0.1 parts per million (ppm) of the base station's reference frequency, in other words, 0.1 ppm compared to the signals received from the base station. Although, the prior art Maximum Likelihood method can be used to obtain reliable frequency tracking, but it requires a long data stream and complex computation. Similarly, the prior art Time Domain Bias method can also be deployed for estimating frequency offset, but it needs a high sampling rate as well as a long data stream. Accordingly, the AFC subsystem in the receiver of a mobile station needs a reliable, simple, and effective frequency tracking technique to minimize frequency error to an acceptable level.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION

In the detailed description provided below, numerous specific details are provided to impart a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
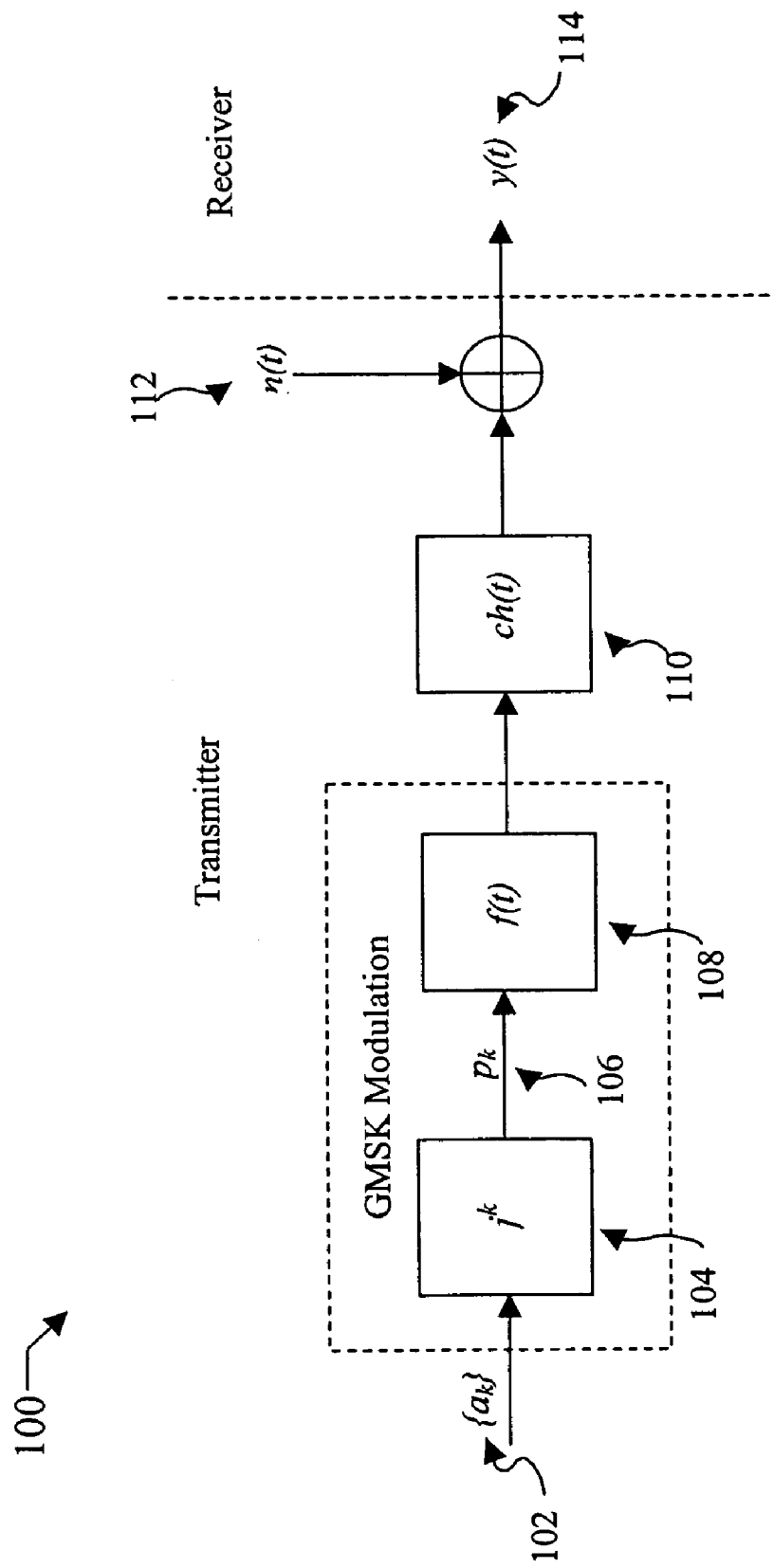
FIG. 1 is a schematic diagram of a baseband transmitter.

FIG. 1 depicts a baseband transmitter 100. Prior to sending the outgoing data $\{a_k\}$ 102 to the mobile station, the baseband transmitter 100 modulates the outgoing data $\{a_k\}$ 102 using Gaussian minimum shift keyed (GMSK) modulation. The modulated data passes through an air channel ch(t) 110. Afterward, a noise component n(t) 112 is added to the data to yield y(t) 114, which is the signal received at the receiver of mobile station. While in recovering GMSK modulated signal at the mobile receiver, we use the linear approximation of GMSK modulation, that is, we regard GMSK modulation as rotated data $p_k$ pass a filter f(t) 108. The linear approximation is shown in dashed block in FIG. 1.

In accordance with the linear approximation of GMSK modulation, $p_k$ 106 is mathematically represented as:

$$p_k = a_k j^k$$

where $a_k$ is the outgoing data and $a_k$ is either 1 or −1. k is the data index. $j^k$ is the modulation phase shift.

Figure 2:
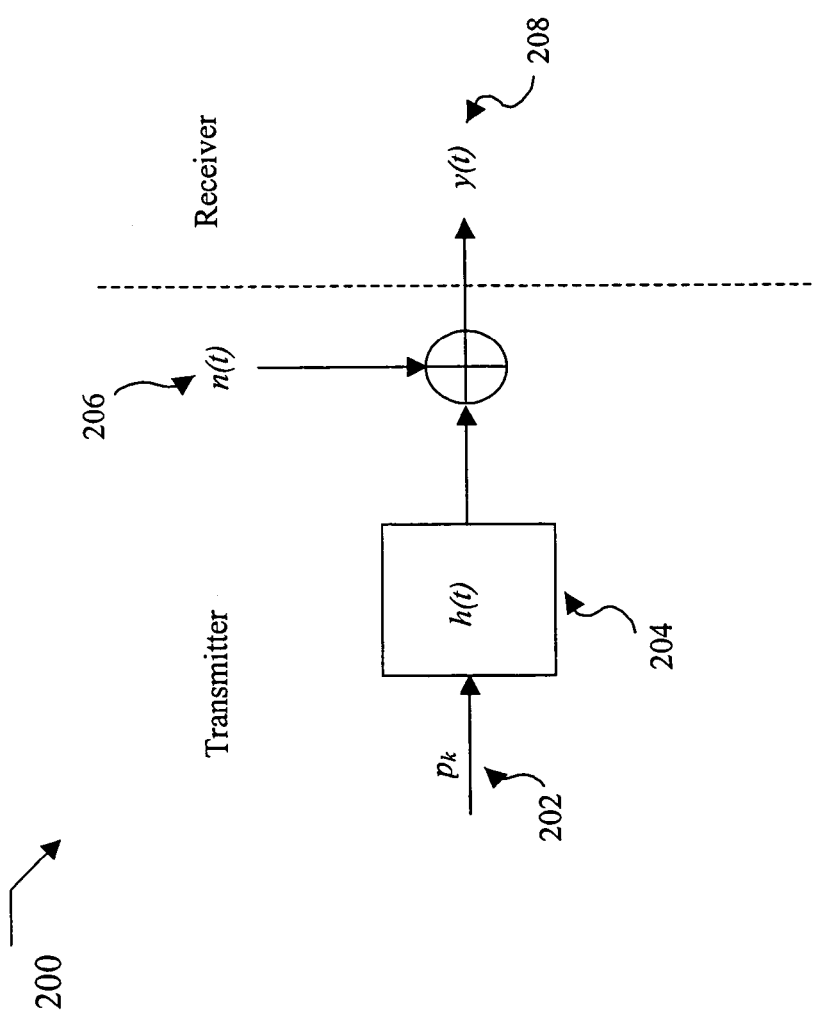
FIG. 2 is a schematic diagram of an equivalent structure of the baseband transmitter shown in FIG. 1.

FIG. 2 illustrates an equivalent channel h(t) 204, which is a concatenation of the filter f(t) 108 and the air channel ch(t) 110 of FIG. 1. h(t) 204 is mathematically represented as:

$$h(t) = f(t) * ch(t)$$

where f(t) is filter f(t) 108 and ch(t) is air channel ch(t) 110.

When incoming data y(t) 114 arrives at the receiver, it is first demodulated and then a frequency offset is added to the demodulated data. The resulting received data is r(k). The frequency offset here does not take into account any frequency offset that may be caused by Doppler shift because Doppler shift cannot be tracked in mobile communications and it is not required by the GSM specification. The received data r(k) is mathematically represented as:

$$r(k)=y(k)\cdot e^{j\omega k}$$

where $e^{j\omega k}$ is the frequency offset, ω is the angle of the frequency offset and k is the data index.

A key component of a mobile station receiver is the AFC subsystem. The AFC contains a frequency tracking mechanism to ensure that the frequency of the mobile station's local VCO tracks the frequency of the base station.

Figure 3:
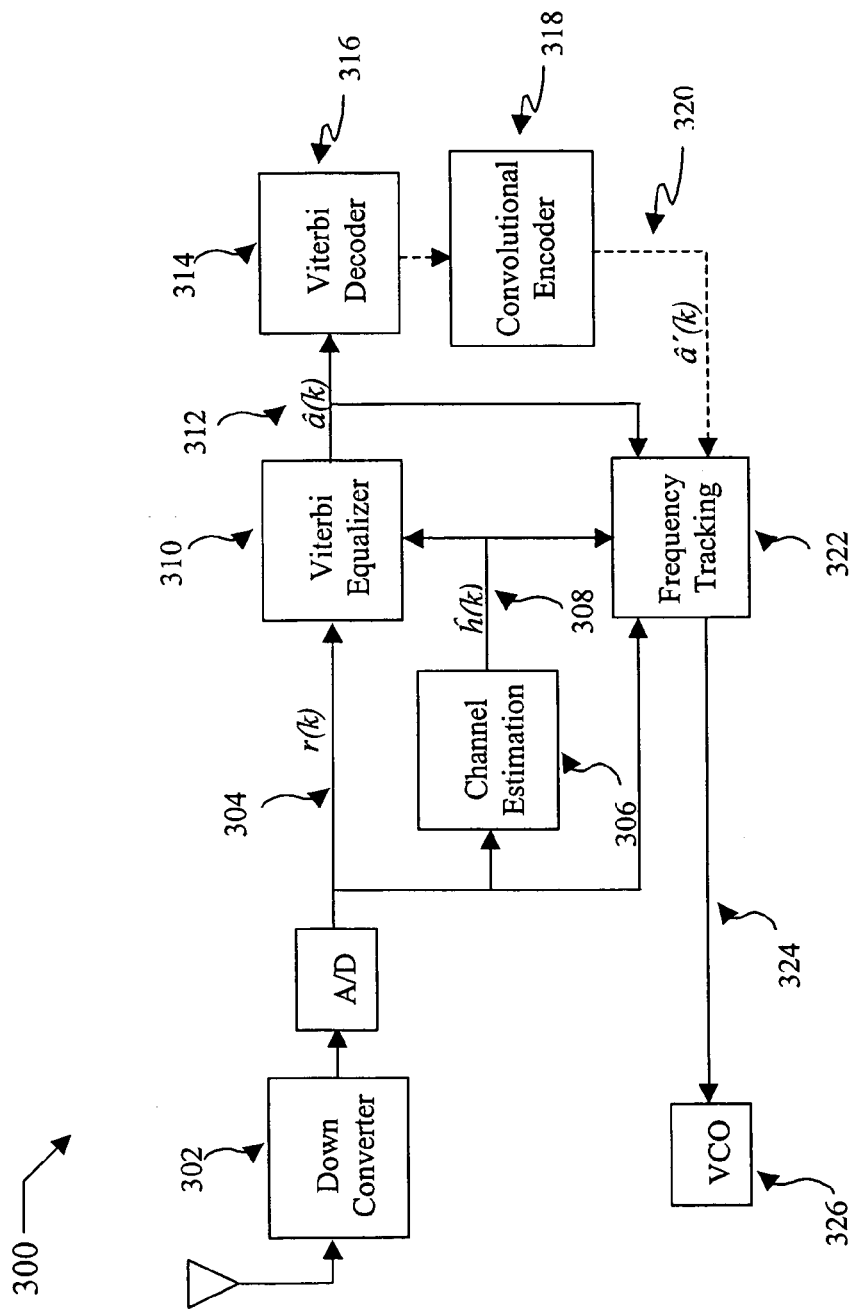
FIG. 3 is a schematic diagram of an Automatic Frequency Control (AFC) subsystem.

FIG. 3 is a schematic diagram of an AFC subsystem. The received data r(k) 304 is one of the inputs into a frequency tracking block 322 used to determine the frequency error within the incoming data bursts. The received data r(c) 304 is also used as an input to a channel estimation block 306 to obtain the estimated channel tap ĥ(k) 308. Additionally, the received data r(k) 304 is input to a Viterbi equalizer 310 to obtain the hard decision Viterbi Equalizer output â(k) 312.

Prior to frequency tracking, initial frequency estimation is performed on the received data r(k) 304 to obtain the estimated channel tap ĥ(k) 308. The channel is estimated by a training sequence in p(k). The estimated channel tap ĥ(k) 308 is mathematically represented as:

$$\hat{h}(k) = \frac{1}{16}\sum_{l=5}^{20} r(k+l)p^*(l)$$

where k=−5, −4, . . . , 0, 1, . . . , 5. The frequency offset has a negligible affect on the channel estimation in the range of −500 Hz to 500 Hz. Thus, the weak taps of the estimated channel taps can be masked.

In one embodiment as illustrated in FIG. 3, the frequency tracking mechanism 322 utilizes the received data r(k) 304, the estimated channel tap ĥ(k) 308, and the hard decision Viterbi output â(k) 312 to determine the direction of the phase rotation, either in the positive direction or negative direction. For each data burst the direction of the phase rotation is ascertained based on the frequency error. Within a given number of data bursts, the number of positive direction rotations and the number of negative direction rotations are added. If the number of positive direction rotations is greater than a predetermined threshold, then the local VCO is tuned one frequency step in the negative direction. If the number of negative direction rotations is greater than a predetermined threshold, then the local VCO is tuned one frequency step in the position direction.

In another embodiment also depicted by FIG. 3, the frequency tracking 322 uses the received data r(k) 304, estimated channel tap ĥ(k) 308, and the recovered convolutionally coded output â'(k) 320 (shown in dash lines) to determine the direction to tune the VCO of the mobile station. Here, the hard (or soft) decision Viterbi equalizer output â(k) 312 is input into the Viterbi decoder 316 and the resulting data is input into the convolutional encoder 318 to produce the resulting recovered convolutionally coded output â'(k) 320.

For each data burst the direction of the phase rotation is determined based on the frequency error. Within a given number of data bursts, the number of positive direction rotations and the number of negative direction rotations are calculated. If the number of positive direction rotations within the given number of data bursts is greater than a predetermined threshold, then the local VCO of the mobile station is tuned one frequency step in the negative direction. If the number of negative direction rotations within the given number of data bursts is greater than a predetermined threshold, then the local VCO of the mobile station is tuned one frequency step in the position direction.

Figure 5:
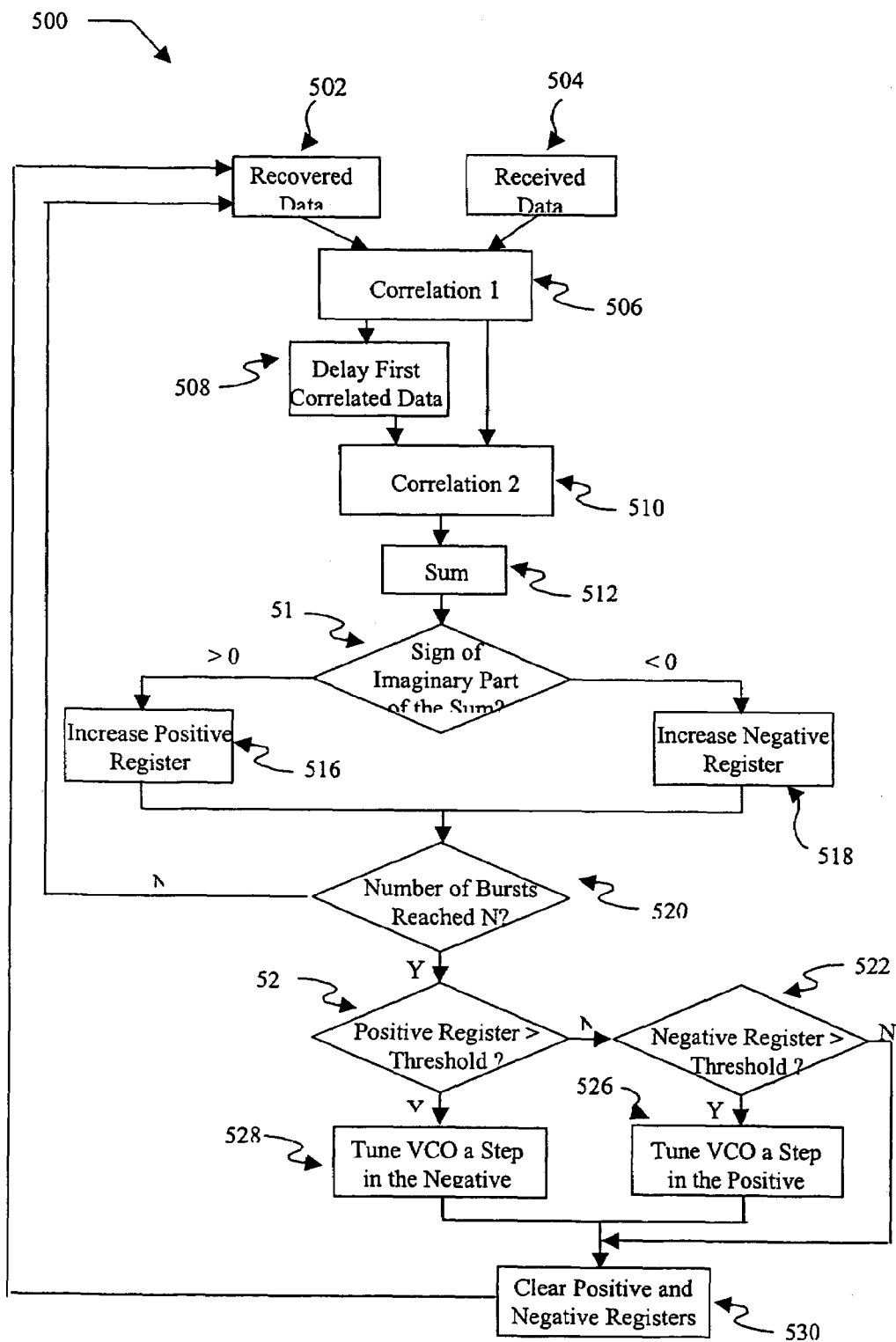
FIG. 5 is a flow diagram of a method of frequency tracking based on recovered data.

Turning first to FIG. 5, which illustrates method 500 for frequency tracking based on the recovered data, at the start of frequency tracking, step 506 correlates the recovered data r̂(k) with the received data r(k). The recovered data r̂(k) is the rotated estimated input p̂(k) passing through the estimated channel tap ĥ(k). The rotated estimated input p̂(k) comprises either the hard decision Viterbi equalizer output â'(k) or the recovered convolutionally coded output â'(k).

Next, in step 508 the result of the first correlated data is delayed. In step 510, a second correlation is performed on the first correlated data of step 506 with the delayed first correlated data of step 508. The second correlation provides the rotation angle caused by the frequency offset. The second correlated data is added to the imaginary part of the second correlated data in step 512. If the result of the sum in step 512 is positive, then the positive register is increased by one. If the result of the sum in step 512 is negative, then the negative register is increased by one. Steps 502 through step 518 are then repeated for N data bursts.

After N data bursts are reached in step 520, if the positive register is greater than the predetermined threshold, then the VCO is tuned one step in the negative direction in step 524. Otherwise, if the negative register is greater than the predetermined threshold, then the VCO is tuned one step in the positive direction in step 526. Finally, in step 530 the positive register and the negative register are cleared.

Figure 4:
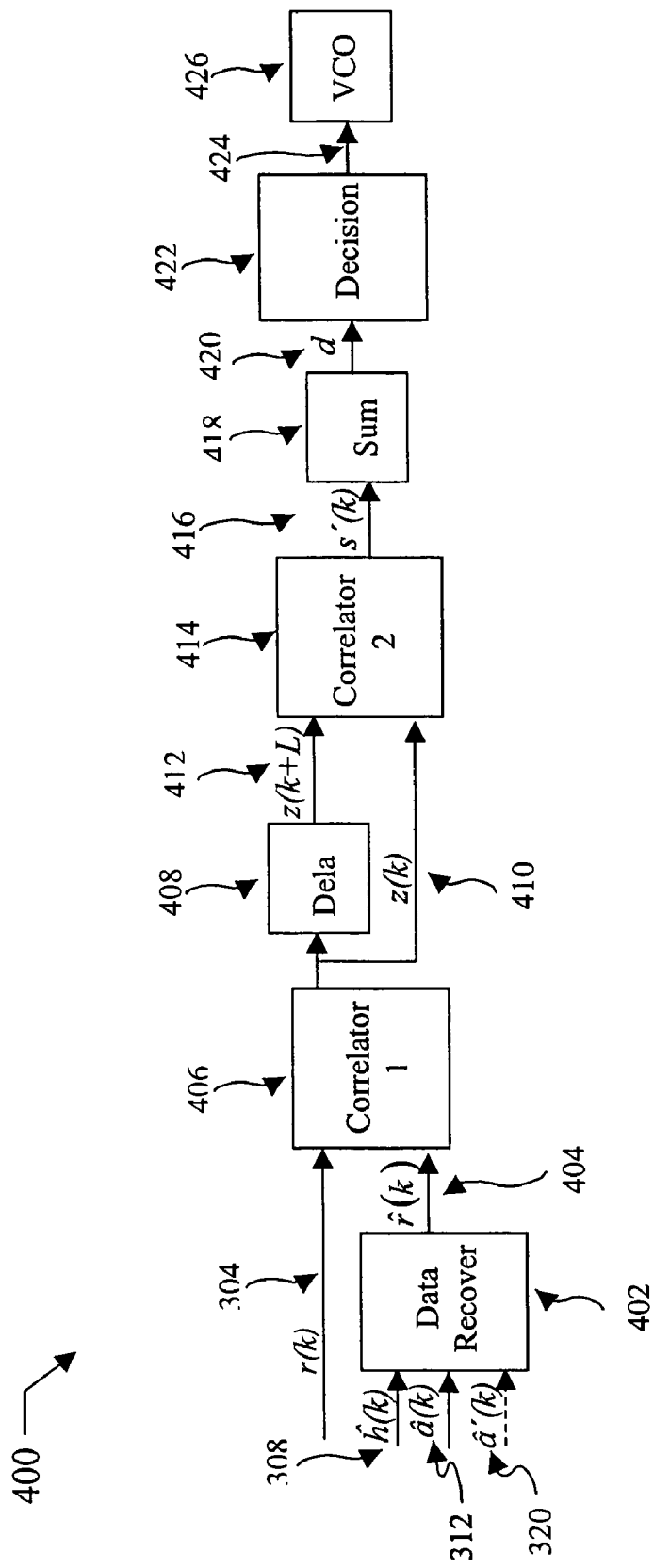
FIG. 4 is a schematic diagram of an apparatus for frequency tracking based on recovered data.

FIG. 4 provides a schematic diagram of a frequency tracking system. In one embodiment, the inputs to a data recover 402 mechanism are the estimated channel tap ĥ(k) 308 and the hard decision Viterbi equalizer output â(k) 312. In another embodiment, the inputs to the data recover 402 mechanism are the estimated channel tap ĥ(k) 308 and the recovered convolutionally coded output â'(k) 320. The input that is either the hard decision Viterbi equalizer output â(k) 312 or the recovered convolutionally coded output â'(k) 320 can be estimated as:

$$\hat{p}_k = \hat{a}_k j^k$$

The rotated estimated input p̂(k) passes through the estimated channel tap ĥ(k) 308 to get the recovered data r̂(k) 404. The recovered data r̂(k) 404 is mathematically represented as:

$$\hat{r}(k)=\hat{p}(k)*\hat{h}(k)=\hat{y}(k)$$

A first correlation 406 is performed on the received data r(k) 304 and the recovered data r̂(k) 404 to obtain the first correlated data z(k) 410. The first correlated data z(k) 410 is mathematically represented as:

$$z(k)=r(k)\cdot\text{conj}(\\ \hat{r}(k))=(y(k)\cdot e^{j\omega k}+n(k))\cdot\text{conj}(\hat{y}(k))\approx|y(k)|^2\cdot e^{j\omega k}+n'(k)$$

where ω is the angle of the frequency offset, k is the data index, and ·n'(k)=n(k)·conj(ŷ(k)).

A second correlation 414 is performed on the first correlated data z(k) 410 and the delayed first correlated data z(k+L) 412, where L is the delayed sample, which is set to adjust the rotation angle in a range to obtain a more precise estimation.

The resulting second correlated data s'(k) 416 is mathematically represented as:

$$s'(k)=z(k+L)\cdot \text{conj}(z(k))$$

The mathematical representation of the imaginary part of s'(k) is:

$$s(k)=\text{imag}\{z(k+L)\cdot \text{conj}(z(k))\}$$

Add the imaginary part s(k) to the second correlated data s'(k) 416 to obtain d 420. The mathematical representation of d 420 is:

$$d = \text{sign}\left(\sum_{k=1}^{M} s(k)\right)$$

where M is the length of s(k).

The decision 422 mechanism counts the number of d>0 and the number of d<0 within every N data bursts. If the number of d>0 is greater than a predetermined threshold, the VCO is tuned one frequency step in the negative direction. If the number of d<0 is greater than a predetermined threshold, the VCO is tune one frequency step in the position direction.

The parameters for a mobile station in a GSM communications system based on the GSM 11.10 requirements in one example may be as follows: L=100; M=40; N can be 100 or 200 received data bursts; and predetermined threshold can be larger than half of N.

While specific embodiments of the invention have been illustrated and described herein, it will be appreciated that various changes can be made therein without departing from the spirit and scope of the invention.

We claim:

1. A method of frequency tracking for an automatic frequency control (AFC) subsystem, the method comprising:
   (a) correlating a recovered data with a received data to produce a first correlated data;
   (b) delaying said first correlated data of step (a) to produce a delayed first correlated data;
   (c) correlating said first correlated data of step (a) and said delayed first correlated data of step (b) to produce a second correlated data;
   (d) adding an imaginary part of said second correlated data to said second correlated data of step (c) to produce a decision data indicative of the frequency fluctuation of said received data;
   (e) increasing a positive register if said decision data is greater than 0;
   (f) increasing a negative register if said decision data is less than 0;
   (g) repeating steps (a)-(f) for N iterations;
   (h) tuning a voltage controlled oscillator that is associated with said AFC by one frequency step in a negative direction if said positive register is greater than a predetermined threshold value; and
   (i) tuning said voltage controlled oscillator that is associated with said AFC by one frequency step in a positive direction if said negative register is greater than said predetermined threshold value.

2. The method of claim 1, wherein said received data comprises a demodulated incoming data with a frequency offset added.

3. The method of claim 2, wherein said frequency offset is ejωk.

4. The method of claim 2, wherein said frequency offset comprises a difference between the radio frequency carrier of a mobile station and the radio frequency carrier reference in the base station.

5. The method of claim 2, wherein said received data is calculated by:

$$r(k)=y(k)\cdot e^{j\omega k}$$

where y(k) is said demodulated incoming data, ejωk is said frequency offset added to said demodulated incoming data, and r(k) is said received data.

6. The method of claim 1, wherein said recovered data comprises a rotated estimated input passing through an estimated channel tap.

7. The method of claim 6, wherein said rotated estimated input comprises a hard decision Viterbi Equalizer output.

8. The method of claim 7, wherein said hard decision Viterbi Equalizer output is â(k).

9. The method of claim 6, wherein said rotated estimated input comprises a recovered Convolutional Encoder output.

10. The method of claim 9, wherein said recovered Convolutional Encoder output is â'(k).

11. The method of claim 6, wherein said rotated estimated input is determined by:

$$\hat{p}_k = \hat{a}_k j^k$$

where k=−5, −4, . . . , 0, 1, . . . , 5.

12. The method of claim 6, wherein said estimated channel tap is determined by:

$$\hat{h}(k) = \frac{1}{16}\sum_{l=5}^{20} r(k+l)p^*(l)$$

13. The method of claim 1, wherein said recovered data is determined by:

$$\hat{r}(k)=\hat{p}(k)*\hat{h}(k)=\hat{y}(k).$$

14. The method of claim 1, wherein said first correlated data is determined by:

$$z(k)=r(k)\cdot \text{conj}(\hat{r}(k))=(y(k)\cdot e^{j\omega k}+n(k))\cdot \text{conj}(\hat{y}(k))\approx |y(k)|^2\cdot e^{j\omega k}+n'(k)$$

where ω is the angle of the frequency offset and ·n'(k)=n(k)·conj(ŷ(k)).

15. The method of claim 1, wherein said second correlated data is determined by:

$$s'(k)=z(k+L)\cdot \text{conj}(z(k))$$

where L is the delayed sample.

16. The method of claim 15, wherein said parameter L is 100.

17. The method of claim 1, wherein said imaginary part of said second correlated data is determined by:

$$s(k)=\text{imag}\{z(k+L)\cdot \text{conj}(z(k))\}.$$

18. The method of claim 1, wherein said decision data is determined by:

$$d = \text{sign}\left(\sum_{k=1}^{M} s(k)\right)$$

where M is the length of s(k).

19. The method of claim 18, wherein said parameter M is 40.

20. The method of claim 1, wherein said N iterations is 100.

21. The method of claim 1, wherein said N iterations is 200.

22. The method of claim 1, wherein said predetermined threshold is larger than half of said N iterations.

23. A method of frequency tracking for an Automatic Frequency Control (AFC) subsystem, the method comprising:
   (a) correlating a recovered data with a received data to produce a first correlated data as:

$z(k)=r(k)\cdot\text{conj}(\hat{r}(k))=(y(k)\cdot e^{j\omega k}+n(k)\cdot\text{conj}(\hat{y}(k))\approx|y(k)|^2\cdot e^{j\omega k}+n'(k)$ where ω is the angle of the frequency offset and · n'(k)=n(k)·conj(ŷ(k));
   (b) delaying said first correlated data of step (a) to produce a delayed first correlated data;
   (c) correlating said first correlated data of step (a) and said delayed first correlated data of step (b) to produce a second correlated data as:

$s'(k)=z(k+L)\cdot\text{conj}(z(k))$ where L is the delayed sample;
   (d) adding an imaginary part of said second correlated data to said second correlated data of step (c) to produce a decision data as:

$$d = \text{sign}\left(\sum_{k=1}^{M} s(k)\right)$$

where M is the length of s(k);
   (e) increasing a positive register if said decision data is greater than 0;
   (f) increasing a negative register if said decision data is less than 0;
   (g) repeating steps (a)-(f) for N iterations;
   (h) tuning a voltage controlled oscillator that is associated with said AFC by one frequency step in a negative direction if said positive register is greater than a predetermined threshold value; and
   (i) tuning said voltage controlled oscillator that is associated with said AFC by one frequency step in a positive direction if said negative register is greater than said predetermined threshold value.

24. An apparatus for frequency tracking at a mobile station comprising:
   (a) a correlator for correlating a recovered data and a received data to obtain a first correlated data;
   (b) a delay unit for delaying said first correlated data;
   (c) a correlator for correlating said first correlated data and said delayed first correlated data to obtain a second correlated data;
   (d) an adder for adding an imaginary part of said second correlated data to said second correlated data to obtain a decision data;
   (e) a positive register is incremented if said decision data is greater than 0;
   (f) a negative register is incremented if said decision data is less than 0;
   (g) a counter to determine if N iterations has occurred;
   (h) a decision unit to determine if said positive register is greater than a predetermined threshold value for tuning voltage controlled oscillator a frequency step in a negative direction; and
   (i) said decision unit to determine if said negative register is greater than a predetermined threshold value for tuning voltage controlled oscillator a frequency step in a negative direction.

* * * * *